United States Patent [19]

Kaye

[11] Patent Number: 4,497,542

[45] Date of Patent: Feb. 5, 1985

[54] APPARATUS FOR MINIMIZING BEAM COLLIMATION SENSITIVITY IN OPTICAL INSTRUMENTS INCLUDING LIQUID CRYSTAL CELLS

[75] Inventor: Wilbur I. Kaye, Corona Del Mar, Calif.

[73] Assignee: Beckman Instruments, Inc., Fullerton, Calif.

[21] Appl. No.: 269,141

[22] Filed: Jun. 1, 1981

Related U.S. Application Data

[63] Continuation of Ser. No. 45,726, Jun. 5, 1979, abandoned.

[51] Int. Cl.³ .................. G02F 1/137; G02F 1/135
[52] U.S. Cl. .................. 350/335; 350/347 E
[58] Field of Search .................. 350/335, 345, 347 E, 350/341

[56] References Cited

U.S. PATENT DOCUMENTS

| 2,785,601 | 3/1957 | Francon | 350/404 X |
|---|---|---|---|
| 3,601,468 | 8/1971 | Dalley | 350/403 X |
| 3,674,338 | 8/1970 | Cartmell et al. | 350/331 R X |
| 3,785,721 | 1/1974 | Harsch | 350/347 E |
| 3,944,331 | 3/1976 | Janning | 350/341 |
| 3,946,616 | 3/1976 | Jones | 350/338 X |
| 4,042,294 | 8/1977 | Billings et al. | 350/345 |
| 4,069,404 | 1/1978 | Minoprio et al. | 362/200 X |
| 4,088,400 | 5/1978 | Assouline et al. | 350/347 R |
| 4,097,128 | 6/1978 | Matsumoto et al. | 350/347 E |
| 4,099,855 | 7/1978 | Wisbey et al. | 350/335 X |
| 4,136,933 | 1/1979 | Adams et al. | 350/341 |
| 4,171,874 | 10/1979 | Bigelow et al. | 350/345 |
| 4,185,895 | 1/1980 | Stephens et al. | 350/345 |

FOREIGN PATENT DOCUMENTS 2700981 12/1977 Fed. Rep. of Germany .

OTHER PUBLICATIONS

Schiekel et al., "Deformation of Nematic Liquid Crystals with Vertical Orientation in Electrical Fields", Applied Physics Letters, vol. 19, No. 10, Nov. 15, 1971.

Primary Examiner—John K. Corbin
Assistant Examiner—David Lewis
Attorney, Agent, or Firm—R. J. Steinmeyer; R. R. Meads; S. R. Markl

[57] ABSTRACT

In an optical instrument including a birefringent liquid crystal cell of the type consisting of a pair of transparent plates and a zero-twist, nematic-phase, liquid crystal material with a positive dielectric anisotropy between the plates, the liquid crystal molecules being oriented in and tilting in a plane perpendicular to the cell plates, a beam of light being conducted through the cell, generally normal to the plates thereof, it has been observed that if all of the rays of the beam are not collimated, each ray will suffer a different retardation in passing through the cell and this is unacceptable in most applications. This problem is minimized, according to the present invention, by using a filament light source positioned with the filament axis normal to the plane of the tilting molecule axes or by using two liquid crystal cells between a pair of polarizers, one of the cells being rotated 180° relative to the other about an axis normal to the plates thereof whereby the liquid crystal molecules of the cells tilt in opposite directions.

15 Claims, 8 Drawing Figures

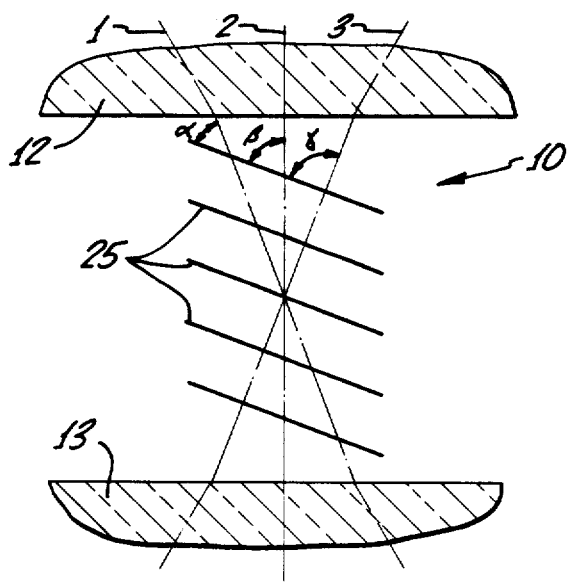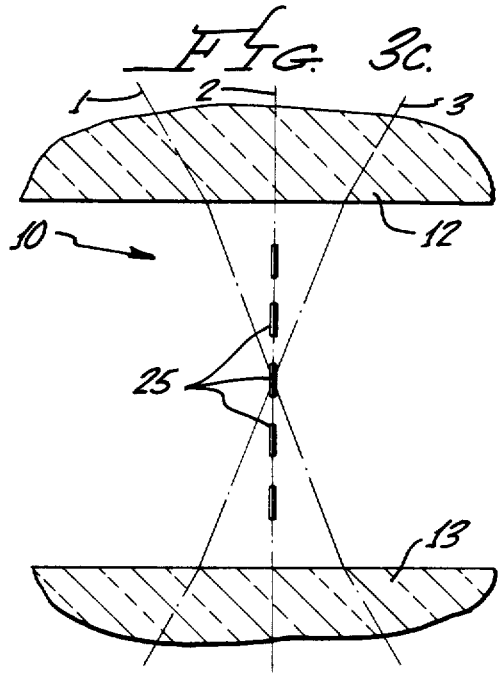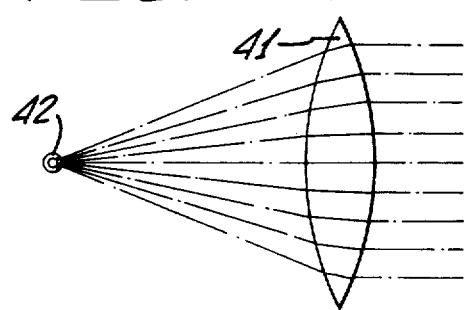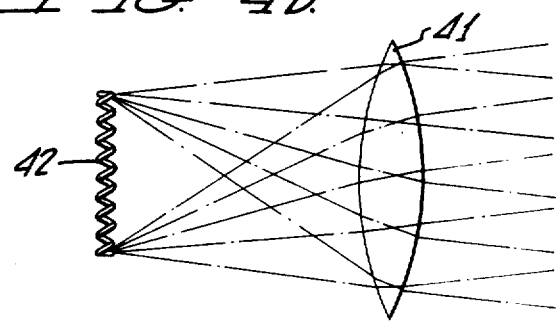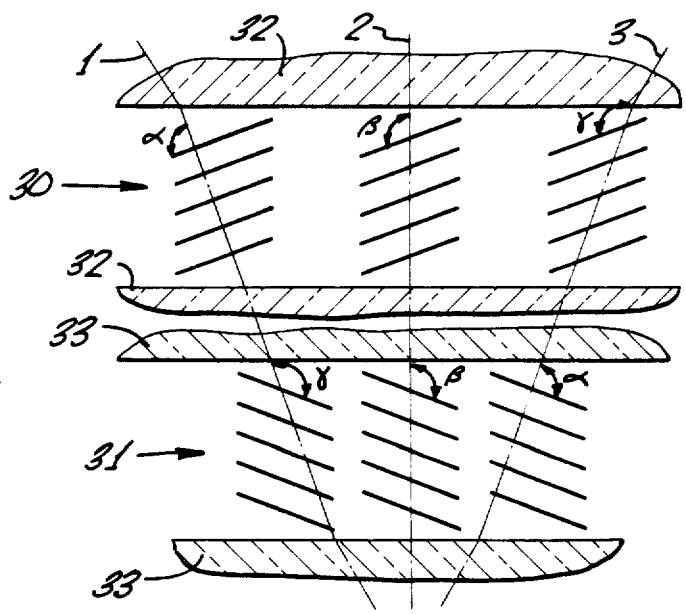

APPARATUS FOR MINIMIZING BEAM COLLIMATION SENSITIVITY IN OPTICAL INSTRUMENTS INCLUDING LIQUID CRYSTAL CELLS

This is a continuation of application Ser. No. 045,726, filed June 5, 1979 now abandoned.

BACKGROUND OF THE INVENTION

1. Field of the Invention

The present invention relates to optical instruments utilizing birefringent liquid crystal cells and, more particularly, to apparatus for minimizing beam collimation sensitivity in optical instruments which utilize birefringent liquid crystal cells.

2. Description of the Prior Art

Birefringent cells have the property that their refractive index, hence the velocity of propagation of light therethrough, varies with direction through the cell. Such materials are said to be anisotropic. When a polarized light beam passes through a birefringent cell, the beam breaks into two orthogonally polarized components called the ordinary and extraordinary rays, which propagate with velocities which are inversely proportional to the two refractive indices existing in the directions of beam propagation. These two beams emerge from the birefringent cell with a difference in phase angles. The resultant beam, in general, is said to be elliptically polarized.

When the elliptically-polarized light beam passes through a polarizer, only those components of the beam with their electric vectors in the plane of polarization of the polarizer pass therethrough. The two component beams then interfere and the intensity of the resultant beam is a function of the relative phase angles of the component beams. The greater the product of birefringence and optical path through the birefringent material, the greater the phase angle shift.

If the slow ray emerges with its phase angle 90° behind the fast ray, the two beams totally interfere and the intensity of the beam falls to zero. If the slow ray emerges with its phase angle 180° or some multiple of 180° behind the fast ray, the two rays interfere constructively and there is no diminution of beam intensity.

Assuming that the optic axis of a birefringent cell has been oriented 45° from the parallel planes of polarization of polarizers on opposite sides thereof, the phase angle difference between the component beams is a function of the difference in refractive indices in the orthogonally propagating beam directions, the birefringence, $\Delta n$, the thickness, $d$, of the birefringent material, and the wavelength, $\lambda$, of light. Thus, the relative phase angle is:

$$\delta = \frac{2\pi d \Delta n}{\lambda} \quad (1)$$

The intensity of light passing through the second polarizer, neglecting any absorption losses, is given by the equation:

$$I = 1 - \sin^2(\pi \Delta n d / \lambda).$$

Most birefringent materials have a fixed refractive index, although it is possible to change the birefringence in some materials. For example, this has been accomplished by utilizing stressed polymer films as variable retarders. A variable birefringence can also be induced in almost any liquid by applying a strong electric field. The Kerr cell is such a device. However, none of these materials are very useful because of a variety of complicating factors.

On the other hand, it is a relatively simple matter to vary the birefringence in a liquid crystal cell simply by varying the voltage applied thereto. Because of this characteristic, liquid crystal cells are excellent candidates for use in a variety of different types of optical instruments.

By way of example, there is disclosed, in my copending application, Ser. No. 045,725 now U.S. Pat. No. 4,394,069 filed concurrently herewith and entitled Liquid Crystal Tuned Birefringent Filter, a moderately narrow-band, tunable, birefringent filter using zero-twist, nematic-phase, liquid crystal cells as variable retarders. Such patent application also describes a variety of different types of optical instruments which make use of the variable birefringence characteristics of such a filter.

What is basic in any optical instrument which includes a birefringent liquid crystal cell is that a beam of polarized light is passed through the cell. The effective birefringence of such a cell depends upon the angle between the optic axis thereof and the propagation direction of a ray passing through the cell. The optical path length for a beam passing through the cell is the product of the refractive index of the cell in the plane of beam propagation and path length. Thus, a liquid crystal cell can be used to vary retardation or optical path length. Tuning with the liquid crystal cell is accomplished by tilting the average optic axis of the liquid crystal molecules. It is not essential that all of the liquid crystal molecules have parallel optic axes as long as all of these axes lie in the plane of beam polarization. However, if all of the rays are not parallel (collimated), each ray will suffer a different retardation, not only because of propagation along paths of different lengths, but also because of propagation along paths of different indices of refraction.

If the optic axis of the liquid crystal molecules is normal to the beam propagation direction, the above two factors compensate one another. However, it is impractical, in a liquid crystal cell, to orient the optic axis of the liquid crystal molecules parallel to the cell surface and normal to the light beam. The reasons for this is that upon the application of an electric field to such a cell, the molecules would not know which way to tilt and would exhibit a breakup pattern leading to intensely scattered light. For this reason, it is necessary to align the liquid crystal molecules with a uniform finite surface director tilt with no electric field applied between the plates and, for this reason, optical instruments including liquid crystal cells are more sensitive to beam collimation than are instruments using conventional birefringent elements.

Because of the above, optical instruments utilizing birefringent liquid crystal cells require the light beam to be collimated. When using a lens with a point source, there is little difficulty from beam collimation. However, if the source is large, collimation will be poor. Spatial filters are often used to reduce the apparent size of a source, but at considerable expense in beam power. However, this has been the only practical solution available heretofore.

SUMMARY OF THE INVENTION

According to the present invention, the problems caused by a lack of beam collimation in optical instruments including birefringent liquid crystal cells are minimized in a manner unknown heretofore. The present invention relies on the fact that in a liquid crystal cell of the type incorporating a zero-twist, nematic-phase, liquid crystal material with a positive dielectric anisotropy, the cell is sensitive to beam divergence in the plane defined by the molecular director and the direction of beam propagation, but insensitive to beam divergence in the orthogonal planes. Therefore, beam collimation sensitivity can be minimized by using a typical tungsten filament source which has a rectangular cross-section and presents a rectangular aspect to the collimating optics. Without using a spatial filter, such a source will be collimated (by a simple lens or mirror) better in one plane than in the orthogonal plane. If, therefore, the long axis of the filament is oriented in a direction perpendicular to the direction of the molecular director, the beam will be well collimated in the plane of the molecular director and poorly collimated in the orthogonal plane. However, since it is only the plane of the molecular director which requires good collimation, the result is to minimize the effects of beam collimation without sacrificing beam power at a spatial filter.

Alternatively, two liquid crystal cells may be positioned in a stack with the plates thereof parallel whereby a beam of light passing through one of the cells, generally normal to the plates, passes through both of the cells, the pair of cells being positioned between a pair of polarizers. One of the cells is rotated 180° relative to the other about an axis normal to the plates whereby the liquid crystal molecules of the cells tilt in opposite directions. This has the effects of compensating for a lack of beam collimation, making the combined cell less sensitive to collimation effects and, at the same time, doubling retardation without increasing response time.

It is therefore an object of the present invention to provide an improvement for optical instruments including birefringent liquid crystal cells.

It is another object of the present invention to provide apparatus for compensating for lack of beam collimation in an optical instrument including a birefringent liquid crystal cell.

It is a still further object of the present invention to provide a light source for an optical instrument including a birefringent liquid crystal cell which minimizes beam collimation sensitivity.

It is another object of the present invention to provide a compensated liquid crystal cell structure for an optical instrument which minimizes beam collimation sensitivity.

Still other objects, features, and attendant advantages of the present invention will become apparent to those skilled in the art from a reading of the following detailed description of the preferred embodiments constructed in accordance therewith taken in conjunction with the accompanying drawings, wherein like numerals designate like parts in the several figures and wherein:

BRIEF DESCRIPTION OF THE DRAWINGS

FIGS. 3(a)-3(c) are highly simplified schematic cross-sectional views of the liquid crystal cell of FIG. 1 showing the effects of a lack of beam collimation;

FIGS. 4(a) and 4(b) are side elevation views of a tungsten filament source and collimating optics to show a first embodiment of apparatus for minimizing beam collimation sensitivity; and FIG. 5 is a schematic cross-sectional view of a pair of liquid crystal cells showing a second embodiment of apparatus for minimizing beam collimation sensitivity.

DESCRIPTION OF THE PREFERRED EMBODIMENTS

Figure 1:
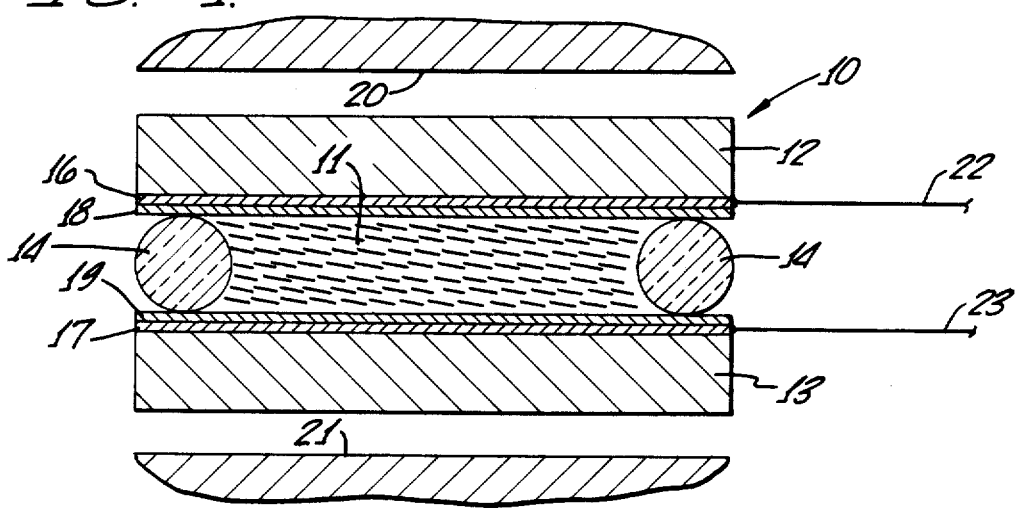
FIG. 1 is a schematic cross-sectional view of a liquid crystal cell.

Referring now to the drawings and, more particularly, to FIG. 1 thereof, there is shown a liquid crystal cell, generally designated 10. Cell 10 consists of a thin layer of liquid crystal material 11 sandwiched between first and second transparent plates 12 and 13 which are preferably made from glass. The spacing between plates 12 and 13 and, therefore, the thickness of the liquid crystal layer is determined by suitable spacers 14. The inside surfaces of plates 12 and 13 are typically coated with transparent conducting layers 16 and 17, respectively, and transparent alignment layers 18 and 19, respectively. Conducting layers 16 and 17 are connected to electrical leads 22 and 23, respectively, which are connectable to a source of voltage (not shown) for varying the birefringence of cell 10.

For use in an optical instrument, liquid crystal material 11 is preferably of the zero-twist, nematic-phase type with a positive dielectric anisotropy. A variety of suitable materials are known to those skilled in the art. A mixture of trans cyano, alkyl biphenyl homologues is one of the most widely used materials for liquid crystal displays. Another available material is a pure trans cyano, propyl phenyl cyclohexane. Another available material is a eutectic mixture of propyl, pentyl, and heptyl cyano phenyl cyclohexane in the mole ration 2.1 to 1.6 to 1.

For use in an optical instrument, plates 12 and 13 should have high transmittance, low strain, and maximum flatness. The sides of plates 12 and 13 are typically polished to ¼ fringe. Conducting layers 16 and 17 are typically a tin-doped $In_2O_3$ layer. The technique for the deposition of such a layer onto plates 12 and 13 is well known to those skilled in the art.

In a liquid crystal cell, it is necessary to align the liquid crystal molecules such that the long axes of the molecules are parallel to each other and approximately parallel to the surfaces of plates 12 and 13. This can be achieved by rubbing the inside surfaces of plates 12 and 13, as is known in the art. Alternately, alignment layers 18 and 19 on the inside surfaces of plates 12 and 13 may be used. In this later case, the liquid crystal molecules are typically aligned with layers of SiO deposited by evaporation at low or high angles relative to the surfaces of plates 12 and 13 (so called L and H coats).

When using a liquid crystal cell as a variable retarder in an optical instrument, each cell 10 is sandwiched between a pair of polarizers 20 and 21. In such case, the optical axes of polarizers 20 and 21 are parallel or crossed and oriented at a 45° angle to the optical axis of cell 10. When using a liquid crystal cell to vary optical path length in an optical instrument such as in my co-pending application Ser. No. 045,723, now abandoned, filed concurrently herewith, and entitled Displacement Transducer utilizing a Liquid Crystal Cell, cell 10 can be used with a single polarizer. In such case, the optical axes of the polarizer and the cell are parallel.

Still considering cell 10, it is essential that the retardation in each cell of a plurality of stacked cells be uniform across the area common to a beam of light passing therethrough. Furthermore, since the retardation will be a function of the voltage area of the beam when the field is applied. This uniformity can only be obtained when liquid crystal layer 11 is in a uniform nematic-phase.

In the absence of a field applied between layers 16 and 17, the liquid crystal molecules assume an orientation dictated by alignment layers 18 and 19. That is, the angle between the director, or optic axis, and the plane of electrodes 16 and 17 in the absence of a field is called the surface director tilt and is a function of alignment layers 18 and 19. The two alignment layers most commonly encountered in liquid crystals displays are the socalled H and L coats formed by depositing SiO on plates 12 and 13 at incidence angles of about 60° and 83°, respectively. It has been ascertained that the surface director tilt with an H coat is 0° and with an L coat is 25°. Other alignment layers known to those skilled in the art produce intermediate surface director tilts.

Four general classes of liquid crystal structure can be identified depending upon the surface director tilts. These classes will be called HH (both layers 18 and 19 being H layers), HL (one of layers 18 and 19 being an H layer and the other being an L layer), uniform LL (both layers 18 and 19 being L layers with the directors tilted in the same direction), and splayed LL (both layers 18 and 19 being L layers with the directors tilted in opposite directions).

When a field is applied to any of these cells, by applying a voltage between conducting layers 16 and 17, via leads 22 and 23, respectively, the field exerts a torque on the liquid crystal molecules and this torque is a function of the field strength, the dielectric anisotropy of the liquid crystal molecules, and adjacent to plates 12 and 13 are relatively uninfluenced by the field. The elastic forces of the liquid crystal structure then distribute tilt within the cell and those molecules at the center of the cell are usually tilted most.

In the class HL and uniform LL cells, all the liquid crystal molecules have a finite tilt at zero field. Consequently, any applied field exerts an immediate torque on the molecules and they rotate in the direction initiated by the surface director tilt. In the class HH cells, there is no tilt at zero field; hence, there is no preferred direction for the molecules to rotate when a field is applied. Consequently, different areas of the cell tilt in opposite directions, making this class of cells unsuitable for use in a filter.

The splayed LL cells exhibit an even more troublesome behavior. When a field is applied to these cells, the tilted molecules away from the walls experience the highest initial torque and rotate in directions to increase tilt; however, molecules of opposite tilt exist in these cells at zero field. In an effort to accommodate the elastic forces within these cells, the liquid crystal molecules assume a 180° twist which persists when the field is removed. For this reason, the splayed configuration is to be avoided in a birefringent filter.

Turning to the uniform LL structure, it is noted that splaying cannot occur, hence, it is not usually possible to obtain a twisted structure. The finite surface director tilt also eliminates reverse tilt behavior. Obviously, therefore, this type of cell is to be preferred. Its main disadvantage is the reduced apparent birefringence because of the surface director tilt, but this disadvantage may be negligible if an alignment layer producing a tilt of 3°–10° is used.

Figure 2:
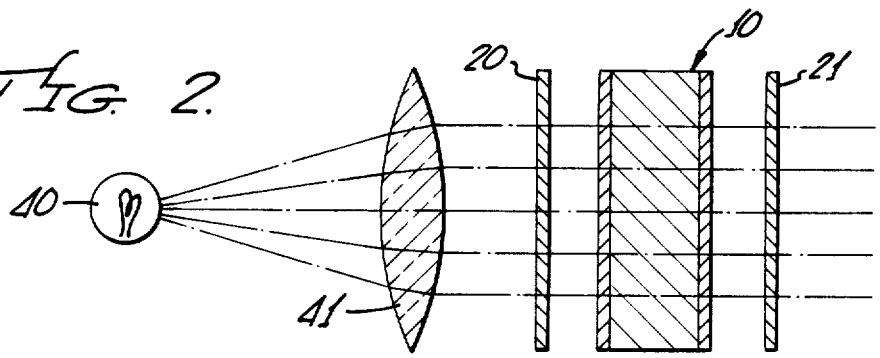
FIG. 2 is a schematic cross-sectional view of a portion of an optical instrument utilizing a liquid crystal cell.

Referring now to FIG. 2, in an optical instrument, light from a source 40 is typically collimated by a lens 41 and conducted through cell 10 having polarizers 20 and 21 on opposite sides thereof. Any number of instruments can utilize this configuration. For examples of some instruments, reference should be had to my beforementioned copending application Ser. No. 045,725 U.S. Pat. No. 4,394,069.

The present invention is concerned with the requirements on beam collimation when using a birefringent cell in an optical instrument. Generally speaking, if different portions of a beam experience varying retardation, the cell does not pass a narrow band of wavelengths and its performance degrades. Such a varying retardation can occur if the cell thickness is not uniform across the beam. It can also occur if the beam converges or diverges on passing through the cell.

That is, if all the rays are not parallel (collimated), different rays will suffer different retardations, both because of propagations along paths of different distances and different indices. This can be most readily seen by examination of FIGS. 3(a), 3(b), and 3(c). In each case, three plane polarized rays, labeled 1, 2, and 3, traverse a cell 10, shown in simplified form, whose molecules, shown as bars 25, assume two different orientations. For convenience, the molecules are shown tilted uniformly across cell 10 through in practice, the tilt will be distributed through the cell in a non-uniform manner as described previously.

Figure 3A:
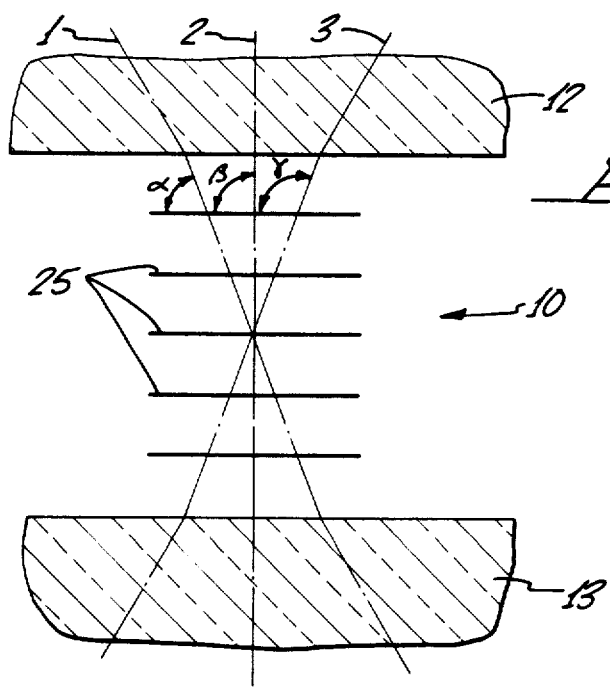

In FIG. 3(a), molecules 25 are homogeneous and in the plane of the sketch. If the plane of polarization of the rays forms an angle of 45° with the plane of the paper, the rays will experience a retardation whose value depends on the distance through the liquid crystal material and the apparent birefringence. This apparent birefringence is a function of the angle between molecules 25 and the rays 1, 2, and 3. As can be seen from an inspection of FIG. 3(a), the angle $\beta$ between ray 2 and molecules 25 is 90° so that the apparent birefringence is equal to the principal birefringence and has a maximum value. On the other hand, rays 1 and 2 traverse a longer path through the liquid crystal material, but also at a lower birefringence because of the angles $\alpha$ and $\gamma$ between rays 1 and 3, respectively, and molecules 25. However, the apparent birefringence for both rays 1 and 3 is the same and, while lower than that for ray 2, the longer path length causes these factors to approximately compensate for each other so that all three rays 1, 2, and 3 experience approximately the same retardation.

As a result, if molecules 25 could be aligned parallel to plates 12 and 13, cell 10 would not be sensitive to beam collimation. However, for reasons described more fully hereinbefore, it is impractical to orient molecules 25 parallel to plates 12 and 13 and normal to the light beam. Upon applying a field to such a cell, molecules 25 would be not known which way to tilt and would exhibit a breakup pattern leading to intensely scattered light. As a result, molecules 25 must be tilted, as shown in FIGS. 3(b) and 3(c).

In FIG. 3(b), molecules 25 are in the plane of the sketch. It can be seen that all three rays 1, 2, and 3 intersect molecules 25 at different angles α, β, and γ so that the apparent birefringences for all three rays differ and are less than the principal birefringence. Furthermore, while the path lengths for rays 1 and 3 are the same, the birefringences for the two are substantially different. As a result, the retardations suffered by rays 1, 2, and 3 are different.

In FIG. 3(c), molecules 25 are tilted in a plane normal to the sketch. In the case, the apparent birefringences for rays 1 and 3 are equal and slightly less than that for ray 2. However, the differences are again compensated for by the optical path through the medium and the rays experience nearly the same retardation.

As the wavelength of incident light changes, transmittance through a liquid crystal cell varies in a cyclic manner. When different rays experience the same retardation, the amplitudes of the oscillations in transmittance with wavelength are greatest. The same can be said of the oscillations in transmittance when ramping voltage on the cells. It is highly desirable to have maximum amplitude. Liquid crystal cells vary retardation by tilting the molecules, hence the cases shown in FIGS. 3(b) and 3(c) cannot be avoided. However, it can be seen from the above analysis that the required collimation for rays in the plane of FIG. 3(b) is much greater than that for rays in the plane of FIG. 3(c).

Referring now to FIGS. 4(a) and 4(b), according to the present invention, there is a practical application for these observations. That is, if a lens or mirror, such as the before-described lens 41, is used to collimate the light from a slit-shaped source 42, the beam is better collimated in a plane normal to the filament axis (see FIG. 4(a)) than in the plane containing the filament axis (see FIG. 4(b)). Therefore, according to the present invention, an optical instrument can be made less sensitive to the problems discussed herein if a filament light source is used, such as a conventional tungsten filament, with the filament axis positioned normal to the plane containing the tilting molecules.

The above-described asymmetrically collimated beam provides an optimum system for most optical instruments including a birefringent liquid crystal cell, but there may be times when asymmetric collimation is undesirable. Under such circumstances, there is another way of reducing collimation sensitivity.

Referring now to FIG. 5, there is shown a highly simplified drawing of a pair of liquid crystal cells 30 and 31 positioned in a stack with the plates 32 and 33, respectively, thereof parallel whereby a beam of light passing through one of the cells, generally normal to the plates, passes through both of the cells. A single plate 32 or 33 could be common to cells 30 and 31. Cells 30 and 31 are positioned between polarizers (not shown). Cells 30 and 31 are positioned with their planes of the tilting molecules coplanar, but one of the cells is rotated 180° relative to the other about an axis normal to the plates whereby the liquid crystal molecules of the cells tilt in opposite directions.

With rays 1, 2, and 3, as described previously with regard to FIGS. 3(a)-3(c), passing through cell 30, the effect will be that the retardations suffered by the three rays will be different. However, upon subsequently passing through cell 31, the retardations will also be different, but in an opposite direction. As a result, the molecular director tilt effects compensate. This makes the combined cell less sensitive to collimation effects. Furthermore, since the response time of the cell is inversely proportional to the thickness thereof, such a configuration permits the use of thinner and faster responding cells without sacrificing total retardation.

It can therefore be seen that according to the present invention, the problems caused by a lack of beam collimation in optical instruments including birefringent liquid crystal cells are minimized in a manner unknown heretofore. The present invention relies on the fact that in a liquid crystal cell of the type incorporating a zero-twist, nematic-phase, liquid crystal material with a positive dielectric anisotropy, the cell is sensitive to beam divergence in the plane defined by the molecular director and the direction of beam propagation, but insensitive to beam divergence in the orthogonal planes. Therefore, beam collimation sensitivity can be minimized by using a typical tungsten filament source which has a rectangular cross-section and presents a rectangular aspect to the collimating optics. Without using a spatial filter, such a source will be collimated better in one plane than in the orthogonal plane. If therefore, the long axis of the filament is oriented in a direction perpendicular to the direction of the molecular director, the beam will be well collimated in the plane of the molecular director and poorly collimated in the orthogonal plane. However, since it is only the plane of the molecular director which requires good collimation, the result is to minimize the effects of beam collimation without sacrificing beam power at a spatial filter.

Alternatively, two liquid crystal cells 30 and 31 may be positioned in a stack with the plates 32 and 33, respectively, thereof parallel whereby a beam of light passing through one of the cells, generally normal to the plates, passes through both of the cells, the pair of cells being positioned between a pair of polarizers. One of the cells is rotated 180° relative to the other about an axis normal to the plates whereby the liquid crystal molecules of the cells tilt in opposite directions. This has the effect of compensating for a lack of beam collimation, making the combined cell has sensitive to collimation effects and, at the same time, doubling retardation without increasing response time.

While the invention has been described with respect to the preferred physical embodiments constructed in accordance therewith, it will be apparent to those skilled in the art that various modifications and improvements may be made without departing from the scope and spirit of the invention. Accordingly, it is to be understood that the invention is not to be limited by the specific illustrative embodiments, but only by the scope of the appended claims.

I claim:

1. In an optical instrument including a birefringent liquid crystal cell including a pair of plates and a zero-twist, nematic-phase, liquid crystal material between said plates, the liquid crystal molecules being oriented in and tilting in a first plane perpendicular to said cell plates, the improvement comprising:

a pair of polarizes positioned on opposite sides of said liquid crystal cell;

a filament light source positioned with the filament axis normal to said first plane; and means for collimating the light from said source and conducting the collimated light through said polarizer and said cell, generally normal to said plates thereof, whereby said light is more effectively collimated in said first plane than in the orthogonal planes.

2. In an optical instrument according to claim 1, the improvement wherein the optical axes of said polarizers are parallel or crossed.

3. In an optical instrument according to claim 1, the improvement wherein the optical axes of said polarizers are parallel to said first plane of said cell.

4. In an optical instrument according to claim 1, or 3, the improvement where said liquid crystal molecules have a uniform, finite surface director tilt with no electric field applied between said plates.

5. In an optical instrument according to claim 4, the improvement wherein said surface director tilt is in the range 3°–10°.

6. An optical instrument comprising:
first and second birefringent liquid crystal cells, each of said cells including:
a pair of plates; and
a zero-twist, nematic-phase, liquid crystal material between said plates, the liquid crystal molecular director being parallel to a first plane perpendicular to said plates, said liquid crystal molecular director having a uniform, non-zero surface director tilt with no electric field applied between said plates; and
said cells being positioned in a stack with the plates thereof parallel whereby a beam of light passing through one of said cells, generally normal to said plates, passes through both of said cells, said cells being positioned with their respective first planes coplanar, one of said cells being rotated 180° relative to the other about an axis normal to said plates whereby the liquid crystal molecules of said cells tilt in opposite directions.

7. An optical instrument according to claim 6, further comprising:
means for directing a generally collimated beam of light through said first and second cells, approximately normal to said plates.

8. An optical instrument according to claim 7, further comprising:
a pair of polarizers in the path of said light beam, both of said cells being positioned between said polarizers, the optical axes of said polarizers being parallel or crossed.

9. An optical instrument according to claim 7, further comprising:
a polarizer positioned in the path of said light beam, the optical axis of said polarizer being parallel to said first planes of said cells.

10. An optical instrument according to claim 6, 7, 8, or 9, wherein said surface director tilt of both of said cells is in the range of 3°–10°.

11. An optical instrument according to claim 6, 7, 8, or 9, further comprising:
means for applying a voltage to both of said cells to vary the birefringence thereof.

12. An optical instrument according to claim 11, wherein the same voltage is applied to both of said cells.

13. An optical instrument according to claim 6, wherein a single plate positioned between said cells is common to both of said cells.

14. An optical instrument comprising:
a birefringent liquid crystal cell bounded on opposite sides by parallel planar surfaces and having an optic axis in a first plane perpendicular to said surfaces, the cell having liquid crystal molecules oriented in and tilting in said first plane;
a pair of polarizers positioned on opposite sides of the cell; and
a slit-shaped source with a long source axis orientated perpendicular to the optic axis for illuminating the birefringent cell and polarizers with collimated light along a propagation path substantially perpendicular to the planar surfaces wherein light is more effectively collimated in said first plane than in the orthogonal planes.

15. An instrument according to claim 14, wherein the optic axis changes orientation within said first plane in response to a voltage applied to the cell.

* * * * *